United States Patent [19]

Sugimura et al.

[11] 4,059,125
[45] Nov. 22, 1977

[54] PRESSURE CONTAINER WITH AN INJECTION VALVE PROVIDED WITH A FUSIBLE VALVE MEMBER

[76] Inventors: Nobuyuki Sugimura; Kazuo Sugimura, both of 1416 Sodeshi-cho, Shizuoka, Shimizu, Japan

[21] Appl. No.: 414,502

[22] Filed: Nov. 9, 1973

[51] Int. Cl.² .............................................. F16K 17/38
[52] U.S. Cl. ........................................ 137/73; 137/74; 137/493.2; 220/89 B
[58] Field of Search .................................. 137/72–74, 137/493.2; 220/89 B, 89; 138/30; 169/19, 26, 57; 122/504.1, 504.3

[56] References Cited

U.S. PATENT DOCUMENTS

| 1,231,458 | 6/1917 | Thurston | 137/72 X |
| 1,388,383 | 8/1921 | Smith | 137/73 |
| 1,740,421 | 12/1929 | Friedman | 122/504.1 X |
| 2,271,786 | 2/1942 | Watkins | 137/73 |
| 3,593,746 | 7/1971 | Allewitz | 138/30 |
| 3,693,644 | 9/1972 | Dilorenzo | 137/71 |

FOREIGN PATENT DOCUMENTS

| 973,928 | 9/1950 | France | 137/74 |

OTHER PUBLICATIONS

*Modern Plastics Encyclopedia*, 1971–1972 Ed., McGraw-Hill Inc., pp. 554–558.

*Primary Examiner*—Martin P. Schwadron
*Assistant Examiner*—Richard Gerard
*Attorney, Agent, or Firm*—Hofgren, Wegner, Allen, Stellman & McCord

[57] ABSTRACT

A novel structure of pressure container is disclosed, wherein a safety valve is provided within an air injection valve of said pressure container, whereby even when the ambient atmosphere of said accumulator has been heated up to a high temperature because of a fire and the like, bursting of said pressure container may be prevented. A valve seat is formed inside of a valve casing and a fusible valve member is brought in contact with said valve seat, so that when the ambient temperature of said pressure container has been raised said fusible valve member may fuse to permit the gas pressure in the pressure container to be discharged to the exterior of the container. Said fusible valve member is filled within a hollow space of a cylindrical valve stem and said valve stem is provided with a passageway or passageways communicating with the interior and exterior thereof, so that when the fusible valve has been fused, the gas within the gas pressure container may blow away the fusible member in a fused state through said passageway or passageways to the exterior of the container.

7 Claims, 11 Drawing Figures

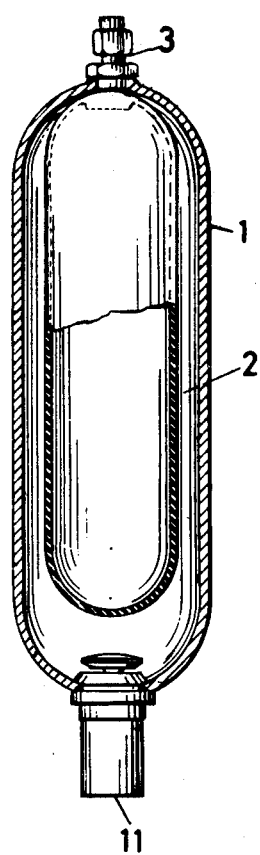
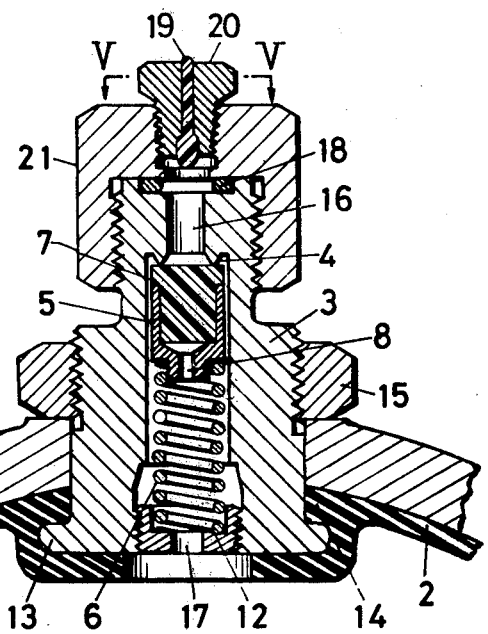
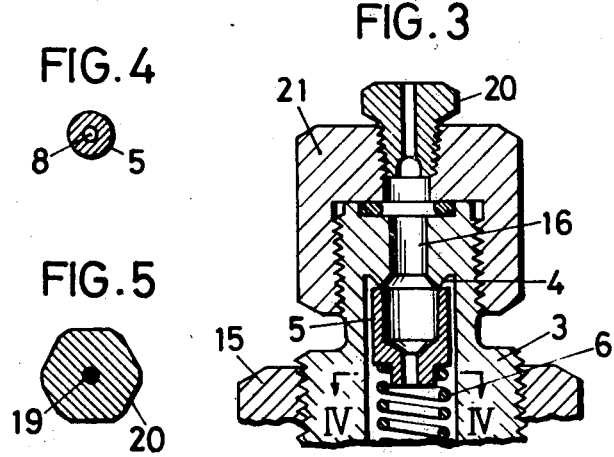
 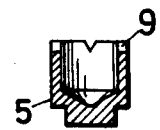 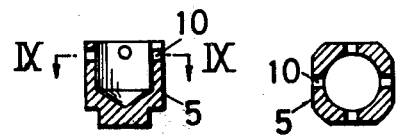

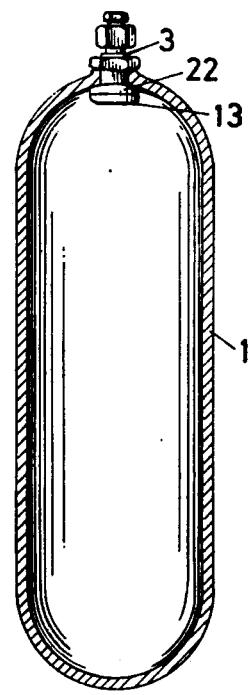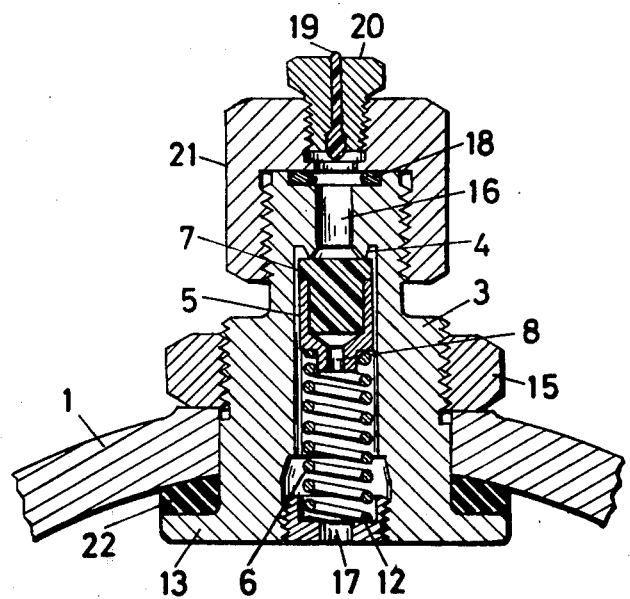

PRESSURE CONTAINER WITH AN INJECTION VALVE PROVIDED WITH A FUSIBLE VALVE MEMBER

The present invention relates to improvement of an accumulator or pressure containers such as gas bomb.

In case that various equipments and installations having a pressure container mounted therein should encounter a fire, there would be a risk that the pressure container may possibly burst out. This is because the volume of nitrogen gas filled in a bladder housed in the pressure container at 300° C becomes about twice as large as the volume of the same at a room temperature, and also because the mechanical strength of the pressure container of the accumulator at 300° C is lower than that at a room temperature.

It is imperatively necessary to provide a safety valve in a pressure container of an accumulator in order to prevent bursting upon temperature rise caused as by a fire. However, in view of the nature of the accumulator construction, if means should be provided for communicating the interior of the gas bladder, which is movably contained within a pressure container, with the safety valve which is fixedly secured to the pressure container, significant obstruction would be caused in the expansion and contraction of the gas bladder.

One object of the present invention is to prevent an accumulator or pressure container as gas bomb from bursting when the temperature of said accumulator should be raised because of a fire or other causes.

Another object of the invention is to provide a safety valve in an accumulator such that said safety valve may not obstruct the expansion and contraction of the bladder at all upon normal operation of the accumulator.

According to the present invention, the aforementioned objects can be achieved by the novel structure of a pressure container, in which a valve casing is provided communicating the exterior of said pressure container with the interior of it, a valve seat being formed inside of said valve casing in which there are provided a cylindrical valve stem and a coil spring, a fusible valve member fills the hollow space of said valve stem so that the top end of said fusible valve member may be brought in contact with said valve seat, and said valve stem is provided with a passageway or passageways communicating the interior and the exterior thereof with each other.

These and other objects and features of the present invention will become more apparent from the following detailed description taken in conjunction with the accompanying drawings, in which:

FIG. 1 is a longitudinal cross-section view showing one preferred embodiment of the present invention of an accumulator utilizing a pressure container;

FIG. 2 is an enlarged partial cross-section view of an essential part of the embodiment in FIG. 1;

FIG. 3 is an enlarged partial cross-section view of the part shown in FIG. 2 but in a different state; FIG. 4 is a transverse cross-section view taken along line IV—IV in FIG. 3;

FIG. 5 is a transverse cross-section view taken along line V—V in FIG. 2;

FIG 6 is a plan view of an alternative embodiment of a part of the valve assembly illustrated in FIG. 3;

FIG. 7 is a cross-section view taken along line VII—VII in FIG. 6;

FIG. 8 is a cross-section view of a further alternative embodiment of the part shown in FIG. 7; and FIG. 9 is a transverse cross-section view taken along line IX—IX in FIG. 8.

FIG. 10 is a longitudinal cross-section view of a gas bomb utilizing a pressure container of the present invention.

FIG. 11 is an enlarged partial cross-section view of an essential part in FIG. 10.

In an accumulator utilizing a pressure case according to the present invention, a gas bladder 2 is contained in the interior of a pressure container 1, and there is provided a valve casing 3 which communicates the exterior of the pressure container 1 with the interior of the gas bladder. This valve casing 3 forms a part of a gas injection device.

As shown in more detail in FIGS. 2 and 3, a valve seat 4 is formed inside of the valve casing 3, and also a cylindrical valve stem 5 and a coil spring 6 are provided within the valve casing 3. The inner space of said valve stem 5 is filled with a fusible valve member 7, a top end of which is brought in contact with said valve seat 4 so that a valve action may be carried out between these two members. Also the valve stem 5 is provided with a passageway 8 communicating the interior and the exterior thereof with each other.

In addition, reference numeral 11 (FIG. 1) designates an inlet and outlet port for the pressurized fluid in the pressure container 1, numeral 12 designates a spring seat, numeral 13 designates a flange formed at the bottom end of the valve casing 3, numeral 14 designates a mounting portion of the bladder 2, numeral 15 designates a fastening nut, numeral 16 designates a bore through which gas is injected and discharged, numeral 17 designates another bore for communicating the inner space of the valve casing 3 with the interior of the bladder 2, numeral 18 designates an O-ring, numeral 19 designates a temperature-sensitive fuse, numeral 20 designates a fuse holder, and numeral 21 designates a protective nut.

While the passageway 8 of the valve stem 5 shown in FIGS. 2 to 4 is formed at the bottom of said valve stem 5, it is also possible to provide the passageways 9 in multiple in a groove shape at the top end of said valve stem 5 as shown in FIGS. 6 and 7.

Alternatively, it is also possible to form the passageways 10 in multiple extending through the side wall of said valve stem 5 as shown in FIGS. 8 and 10. Furthermore, though not illustrated in the drawings, any two or all kinds of said passgeways 8, 9 and 10 at the bottom, top and side wall of the valve stem 5 may be provided in one valve stem 5.

As the material for the fusible valve member 7, synthetic resins such as fluoride containing polymers, nylon, etc. which are lowered in mechanical strength at a temperature of 120° C – 180° C could be used.

Pressure casing 1 shown in FIG. 10 and FIG. 11 is to be used as a gas bomb. Different from that shown in FIGS. 1 – 9 is that instead of gas bladder 2 in the pressure container 1, a packing 22 is provided between flange 13 at the bottom of valve casing 3 and the inner face of the pressure container 1 as shown in FIG. 10 and FIG. 11. It is a matter of course that the inside of pressure container 1 is filled with pressure gas.

Since the accumulator according to the present invention is constructed as described above, in case that a gas is to be injected into the container, it is only necessary to remove the protective nut 21 from the top of the valve casing 3 and to bring a gas injection nozzle (not shown) in communication with the gas injection-discharge bore 16 through which a pressurized gas may be forcibly fed into this portion. Then the fusible valve member 7 is displaced downwardly against the resilient force of the coil spring 6 to create a gap space between the valve seat 4 and the fusible valve member 7. The gas fed through this gap clearance passes through the gap space between the outer circumferential surface of the valve stem 5 and the inner circumferential surface of the valve casing 3, and further passing through the communication bore 17 it reaches the interior of the gas bladder 2 in FIG. 2 or into the pressure container 1 in FIG. 11.

When the gas injection nozzle is removed from the gas injection-discharge bore 16, the fusible valve member 7 is pressed against the valve seat 4 owing to the resilient force of the coil spring 6, so that the gas contained within the gas bladder 2 has its passageway to the exterior blocked by these valve members and thus it cannot leak out.

In case when the ambient temperature of the accumulator should be raised up to about 100° C due to a fire and the like, the temperature-sensitive fuse 19 would be fused down to communicate the injection-discharge bore 16 to the atmosphere, and then if the ambient temperature should be further raised up to about 120° C – 180° C, the fusible valve member 7 provided within the valve housing 3 becomes nearly fused state and thus loses its mechanical strength.

At this moment, the gas contained within the pressure container 1 which has been highly pressurized owing to the temperature rise acts upon the valve member 7 in a nearly fused state through the communication bore 17 and the gas passageway 8 provided in the valve stem 5, so that said valve member 7 is blown away and discharged through the injection-discharge bore 16 to the condition illustrated in FIG. 3, and subsequently the gas contained within the pressure container 1 is also discharged to the external atmosphere.

Since the accumulator according to the present invention is characterized by the aforementioned construction and operations, even if the equipments or installations provided with said accumulators or pressure casing as gas bomb should be heated up due to a fire and the like, bursting of the pressure container 1 could be preliminarily prevented.

In addition, since the various safety mechanism as described above is mounted within the valve casing 3 when used to the accumulator, upon expansion and contraction of the gas bladder 2 during normal operations, the gas bladder 2 is not adversely affected by the safety mechanism.

What is claimed is:

1. A fluid pressure container provided with an injection valve and valve seat for communicating the exterior of said container with the interior of it, characterized by the provision of relief of internal pressure upon ambient temperature rise including:
    a. a hollow valve stem slidably disposed within said injection valve and having at least one passageway extended therethrough, said passageway providing the only path for escape of fluid from within the container to the exterior of the container, and
    b. a fusible valve member filling said hollow valve stem and having a portion of the fusible member in contact with the valve seat of said injection valve providing the sole valve closing function by such contact with the valve seat to retain pressurized fluid in the container, said fusible valve member closing said passageway in said valve stem by said filling the hollow thereof, the injection valve having a fluid passage beyond said seat to the exterior of said container for flow of said fusible valve member under conditions of elevated ambient temperature to open both the passage through the hollow valve stem and said injection valve by removal of the fusible material to the exterior of the container.

2. A pressure container as claimed in claim 1, further characterized in that said fusible valve member is fusible in a temperature range of 120° C to 180° C and above.

3. A pressure container as claimed in claim 2, characterized in that said fusible member is formed of fusible material of fluoride containing polymers.

4. A pressure container as claimed in claim 3, further characterized in that said fusible valve member is formed of nylon.

5. A pressure container as claimed in claim 1, further characterized in that said passageway is formed at the bottom end of said hollow valve stem capable of opening the interior of the container to atmosphere through the valve stem upon removal of the fusible member.

6. A pressure container as claimed in claim 1, further characterized in that said passageway communicating the interior and the exterior of the hollow valve stem with each other is multiple grooves at the top end of said hollow valve stem providing fluid flow passages past said injection valve seat upon removal of the fusible member.

7. A pressure container as claimed in claim 1, further characterized in that said hollow valve stem is cylindrical and passageways communicating the interior and the exterior of the cylindrical valve stem with each other are formed in the circumferential wall of said cylindrical valve stem providing fluid flow passages past said injection valve seat upon removal of the fusible members.

* * * * *